3,479,324
DIRECT ESTERIFICATION METHOD OF PREPARING POLYETHYLENE TEREPHTHALATE WITH AN AMMONIUM OR METAL SALT OF ETHYLENEDIAMINETETRAACETIC ACID
Mary E. Carter, Philadelphia, and John A. Price, Swarthmore, Pa., assignors to FMC Corporation, Philadelphia, Pa., a corporation of Delaware
No Drawing. Continuation-in-part of application Ser. No. 575,251, Aug. 26, 1966. This application Sept. 17, 1968, Ser. No. 760,101
Int. Cl. C08g 17/013
U.S. Cl. 260—75  10 Claims

ABSTRACT OF THE DISCLOSURE

Process of preparing polyethylene terephthalate resin comprising carrying out a direct esterification reaction between terephthalic acid and ethylene glycol in the presence of a suitable ammonium or metal salt of ethylenediaminetetraacetic acid as an esterification additive to form a polyester prepolymer and then to polycondense the said prepolymer.

---

This is a continuation-in-part of our copending U.S. application Ser. No. 575,251, which was filed on Aug. 26, 1966, now abandoned.

This invention relates to a method of preparing filament- and film-forming polyesters. More particularly, it relates to the preparation of polyethylene terephthalate resin having excellent filament- and film-forming properties.

The manufacture of polyester resin by polycondensation of the product formed by the direct esterification of a dicarboxylic acid and a diol, is well known. In the case of polyethylene terephthalate, the direct esterification procedure has not been generally accepted for commercial preparation of the polymer because of the difficulty, when using it, in preparing a satisfactory melt spinnable resin. It is preferred that polyethylene terephthalate resin for filament-forming purposes should have a carboxyl content value of below 50 equivalents per million grams (eq./$10^6$ gr. or meq./kg.), a minimum birefringent melting point of about 258° C., and an intrinsic viscosity of greater than about 0.60, so that the resin can be melt extruded to form filaments and fibers which can be processed to form substantially colorless, stable, high tenacity textile products.

It is an object of the present invention to prepare polyethylene terephthalate resin suitable for melt extrusion into nondegraded, processable filaments and films by a direct esterification and polycondensation procedure.

This and other objects are accomplished in accordance with this invention which concerns a method of preparing filament- and film-forming polyethylene terephthalate resin wherein terephthalic acid and ethylene glycol are directly esterified and the product of esterification is polycondensed in the presence of a condensation catalyst, the improvement comprising carrying out the direct esterification step in the presence of an ammonium or metal salt of ethylenediaminetetraacetic acid (EDTA) in an amount sufficient to improve the polyester resin properties.

While the invention is not limited to a particular salt, group of salts or degree of carboxyl substitution, the preferred salts are those formed with a cation constituent selected from the group consisting of ammonium ($NH_4^+$) and metals from Groups 1a, 2a, 7a and 8 of the Periodic Table (see J. Chem. Educ., vol. 16, p. 409, 1939), and wherein at least two of the carboxyl groups of the EDTA molecule have been substituted with at least one of said cation constituents.

In general, the direct esterification stage of this invention is carried out with a molar ratio of glycol to acid of from about 1:1 to about 15:1, but preferably from about 1.2:1 to 2.5:1. The esterification reaction temperature ranges from about 220 to about 290° C. and the reaction is carried out in the absence of an oxygen containing gas at atmospheric or elevated pressure. The catalytic amount of EDTA salt present during the esterification reaction generally ranges from about $5 \times 10^{-6}$ to about $5 \times 10^{-2}$ moles per mole of terephthalic acid.

When the direct esterification stage is complete as indicated, for example, by the collection of clear distillate, any remaining glycol is distilled off and a polycondensation catalyst is added to the produce and condensation is continued under vacuum.

Conventional polycondensation catalysts include, for example, antimony trioxide, antimony pentoxide, antimony trisulfide, antimony trifluoride, antimony triphenyl, zinc acetylacetonate, lead oxide, sodium alcoholate, lithium hydride, zinc acetate, titanium oxide, ferric acetate, organotin compounds, organomagnesium halides, and the like. These compounds may be added at completion of the esterification reaction or before. They are generally employed in amounts ranging from about 0.005 to about 0.5%, based on the weight of the reactants. The condensation reaction is usually carried out at a reduced pressure of from about 0.1 to 20 mm. of mercury and a temperature of from about 230 to 320° C. in an inert atmosphere.

The process of this invention may be carried out either continuously or batchwise.

The following example is set forth to demonstrate this invention.

EXAMPLE

A mixture containing 84 grams (0.5 mole) of terephthalic acid, 62 grams (1.0 mole) of ethylene glycol, and 0.0151 gram ($5 \times 10^{-5}$ mole) of a salt of ethylenediaminetetraacetic acid was charged to a Fischer-Porter pressure assembly equipped with a nitrogen sparge tube and a distilling arm. The reactor was lowered into an oil bath maintained at 260° C. and flushed for ten minutes with dry nitrogen. A nitrogen pressure of 60 p.s.i. was applied and a distillate of water-ethylene glycol was collected. When a clear liquid, i.e., solution, was obtained, the pressure was reduced to atmospheric and the remaining excess glycol was distilled. The resulting low molecular weight polymer (prepolymer) was further reacted in the presence of 0.04%, based on the weight of the prepolymer, of a conventional polycondensation catalyst, e.g. antimony trioxide or trisulfide, to a high molecular weight polyester under vacuum for four (4) hours at 282° C.

The following table sets forth conditions and results of various reactions carried out as described above.

and 8 of the Periodic Table (J. Chem. Educ., vol. 16, p. 409, 1939).

TABLE

| Esterification Additive | Esterification Time, Hrs.:Min. | Prepolymer Carboxyl Content, meq./kg. | Condensation Catalyst | Intrinsic Viscosity | Melting Pt., °C. | Polymer Carboxyl Content, meq./kg. |
|---|---|---|---|---|---|---|
| None | 3:40 | 316 | None | 0.36 | 261 | 32 |
| Do | 3:40 | 316 | $Sb_2O_3$ | 0.80 | 250 | 40 |
| Dicalcium Salt of EDTA | 2:35 | 190 | $Sb_2O_3$ | 0.90 | 261 | 19 |
| Disodium-Cobaltous Salt of EDTA | 2:45 | 200 | $Sb_2O_3$ | 0.74 | 260 | 64 |
| Barium-Disodium Salt of EDTA | 4:00 | 558 | $Sb_2O_3$ | 0.93 | | 31 |
| Disodium-Cobaltous Salt of EDTA | 2:45 | 200 | $Sb_2S_3$ | 0.71 | 264 | 49 |
| Disodium-Lead Salt of EDTA | 4:25 | 148 | $Sb_2O_3$ | 0.97 | 261 | 31 |
| Dilithium Salt of EDTA | 2:45 | 155 | $Sb_2O_3$ | 1.0 | 262 | 22 |
| Do | 2:45 | 155 | $Sb_2S_3$ | 0.88 | 262 | 38 |
| Tetralithium Salt of EDTA | 2:40 | 325 | $Sb_2O_3$ | 0.96 | 261 | 18 |
| Do | 2:40 | 325 | $Sb_2S_3$ | 0.72 | 263 | 29 |
| Dimagnesium Salt of EDTA | 2:30 | 176 | $Sb_2O_3$ [1] | 0.72 | 264 | 23 |
| Diammonium Salt of EDTA | 6:00 | 86 | $Sb_2O_3$ | 0.93 | | 26 |
| Disodium Manganous Salt of EDTA | 4:30 | 617 | $Sb_2O_3$ | 0.97 | 260 | 29 |
| Dinickel Salt of EDTA | 3:00 | 200 | $Sb_2O_3$ | 0.73 | 260 | 30 |

[1] 2 hour polycondensation time.

The intrinsic viscosity of the polyethylene terephthalate resin products shown in the above table were measured in a 60% phenol-40% tetrachloroethane solution (wt./wt) at 30° C. The other analytical values shown in the above table were determined by conventional laboratory procedures.

In general, the above table shows that the present salts of EDTA are effective esterification additives and consistently produce polymers which are suitable for filament- and film-forming purposes. More particularly, the results shown in the above table indicate that the claimed process through the use of the subject esterification additives provide prepolymers which may be polycondensed to high molecular weight, low diethylene glycol content polymers as indicated by their high intrinsic viscosities and melting points.

Various changes and modifications may be made practicing the invention without departing from the spirit and scope thereof, and therefore, the invention is not to be limited except as defined in the appended claims.

We claim:
1. In a method for preparing polyethylene terephthalate resin wherein terephthalic acid and ethylene glycol are directly esterified and the product of esterification is condensed in the presence of a condensation catalyst, the improvement comprising carrying out the esterification reaction in the presence of a catalytic amount of an ammonium or metal salt of ethylenediaminetetraacetic acid as a direct esterification catalytic additive wherein at least two of the carboxyl groups of said ethylenediaminetetraacetic acid are substituted with a cation selected from ammonium or at least one metal from Groups 1a, 2a, 7a

2. The method of claim 1 wherein the salt is present in an amount ranging from about $5 \times 10^{-6}$ to about $5 \times 10^{-2}$ moles of salt per mole of terephthalic acid.
3. The method of claim 1 wherein the salt is the dicalcium salt of ethylenediaminetetraacetic acid.
4. The method of claim 1 wherein the salt is a sodium salt of ethylenediaminetetraacetic acid.
5. The method of claim 1 wherein the salt is a lithium salt of ethylenediaminetetraacetic acid.
6. The method of claim 1 wherein the salt is a magnesium salt of ethylenediaminetetraacetic acid.
7. The method of claim 1 wherein the salt is a nickel salt of ethylenediaminetetraacetic acid.
8. The method of claim 1 wherein the salt is an ammonium salt of ethylenediaminetetraacetic acid.
9. The method of claim 1 wherein the salt is a disodium-cobaltous salt of ethylenediaminetetraacetic acid.
10. The method of claim 1 wherein the salt is a disodium-manganous salt of ethylenediaminetetraacetic acid.

References Cited
UNITED STATES PATENTS 2,922,771  1/1960  Coler _____ 260—31.2
3,060,152  10/1962  Ringwald _____ 260—75

WILLIAM H. SHORT, Primary Examiner

LOUISE P. QUAST, Assistant Examiner

U.S. Cl. X.R.
260—429, 435, 439, 475, 534